May 26, 1953 A. F. KLINZING 2,639,690
ANIMAL ACTUATED DRINKING FOUNTAIN
Filed Dec. 29, 1950
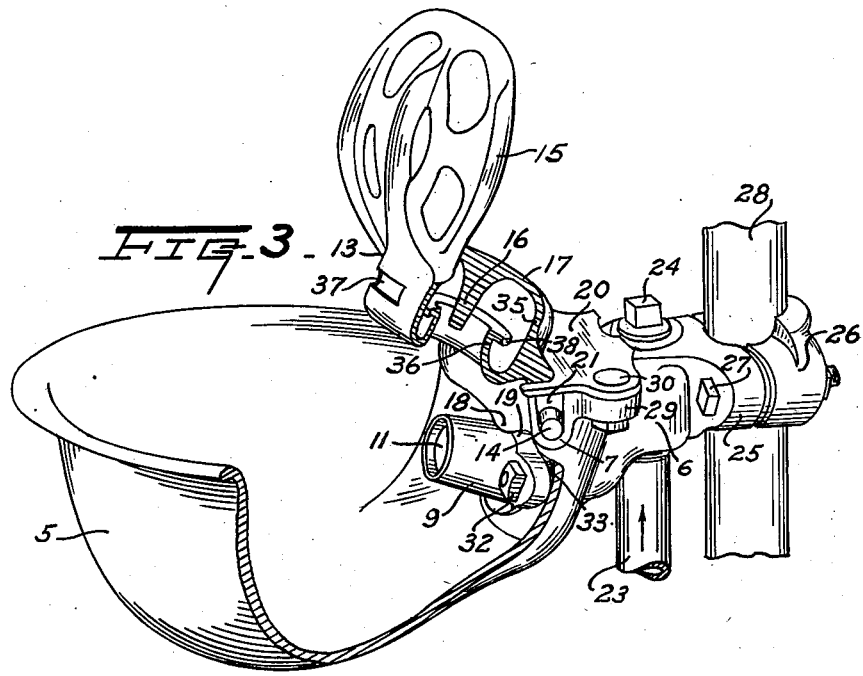
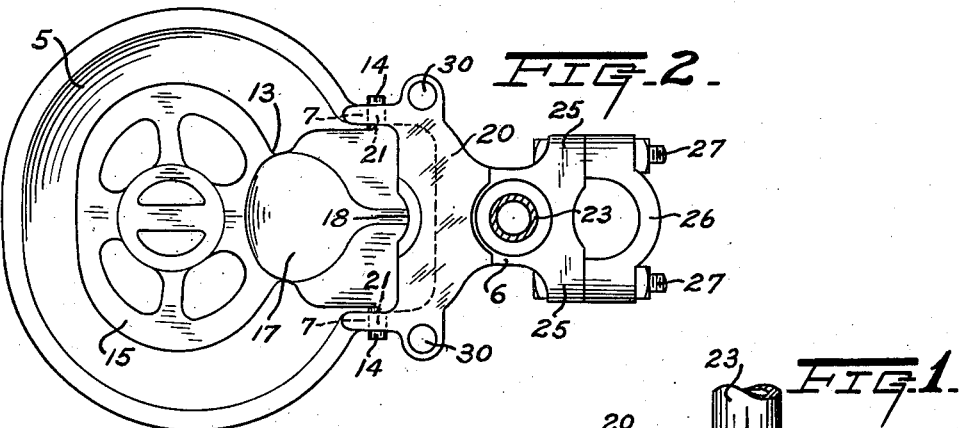
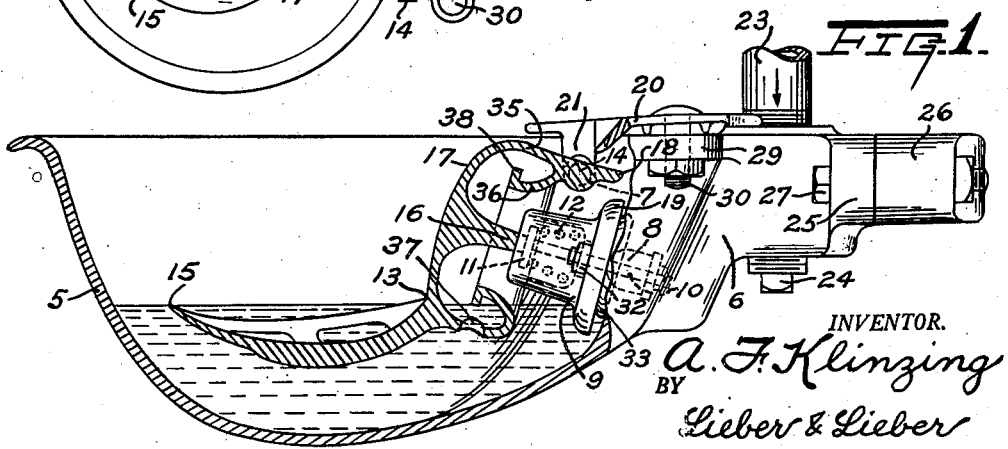
INVENTOR.
A. F. Klinzing
BY Lieber & Lieber
ATTORNEYS.

Patented May 26, 1953

2,639,690

UNITED STATES PATENT OFFICE 2,639,690

ANIMAL ACTUATED DRINKING FOUNTAIN

August F. Klinzing, Milwaukee, Wis.

Application December 29, 1950, Serial No. 203,475

4 Claims. (Cl. 119—75)

My present invention relates generally to improvements in nose actuated stock watering devices, and relates more specifically to improved mechanism for automatically controlling the delivery of fresh water to the drinking bowl of animal actuated fountains or the like.

The principal object of the present invention is to provide an improved stock watering fountain which is simple in structure and efficient in operation.

Many different types of nose actuated stock watering fountains have heretofore been proposed and used extensively with varying degrees of success, but most of these prior devices are still highly objectionable for various reasons. While practically all of the previous nose actuated fountains operate quite satisfactorily when the pressure in the liquid supply line is low, they function to suddenly deliver the fresh liquid to the bowl with considerable force and shock when the liquid source is under high pressure, thereby tending to scare the animals and chasing them away from these watering devices. Then too, many of the previous drinking fountain units of this type are quite complicated, and most of them have obstructions such as nose plate supporting saddles rising from the internal bowl bottoms thereby making it difficult to properly clean the interiors of the bowls. While some of the prior stock waterers have been provided with means for holding the nose plates in inactive position when not in use, most of these holding devices were difficult to manipulate and tended to lock the plates in either active or inactive position due to corrosion of parts, thus making all of the previous fountains objectionable for one reason or another.

It is therefore an important object of my present invention to provide an improved animal drinking fountain in which the fresh liquid is always delivered to the bowl gently and without shock irrespective of the pressure in the liquid supply line or source.

Another important object of this invention is to provide an improved nose actuated stock waterer having a drinking bowl which is internally smooth and unobstructed so that it may be most effectively and easily cleaned.

A further object of the invention is to provide an improved animal watering fountain which is exceedingly simple and compact in construction and all parts of which are conveniently accessible for inspection.

Still another object of my invention is to provide an improved stock watering unit in which the velocity of the fresh liquid is automatically reduced to such an extent that the animals using the fountain will not scare, and wherein entering liquid cannot rush violently over the brim of the receiving bowl or basin.

An additional object of the present invention is to provide an improved animal actuated drinking fountain comprising few simple parts which may be quickly assembled or dismantled without the aid of special tools, and which may be manufactured and sold at moderate cost.

These and other more specific objects and advantages of the invention will be apparent from the following detailed description.

A clear conception of the several features constituting my present improvement, and of the construction and operation of a typical drinking fountain embodying the invention, may be had by referring to the drawing accompanying and forming a part of this specification in which the reference characters designate the same or similar parts in the various views.

Fig. 1 is a part sectional side elevation of one of the improved stock watering fountains, the section having been taken vertically and centrally through the bowl, nose plate, and a portion of the retainer plate;

Fig. 2 is a top view of the fountain shown in Fig. 1, drawn to reduced scale, and showing the nose plate in active position and the liquid supply line entering from above as in Fig. 1; and Fig. 3 is a part sectional perspective view of the same fountain with portions of the bowl and of the nose plate broken away, but showing the nose plate firmly held in inactive position and also showing the fresh liquid supply line entering from below.

The most important feature of my present invention is the provision of simple instrumentalities associated directly with the nose actuated lever or plate of a stock watering fountain, for absorbing the impact or velocity of the entering fresh liquid so that the water will flow into the bowl gently and without shock or excessive noise, and while a shock absorber of a particular and effective shape has been shown and described by way of illustration, it is not my intent or desire to unnecessarily restrict the improvement by virtue of this limited showing. It is also contemplated that specific descriptive terms employed herein be given the broadest possible interpretation consistent with the actual disclosure.

Referring to the drawing, the improved animal drinking fountain shown therein, comprises in general a liquid receptacle or bowl 5 having an integral rear hollow mounting portion 6 and also having a pair of horizontally alined upwardly open saddles or sockets 7 formed in the rear part of the upper bowl brim; a fresh water supply valve 8 carried by a valve casing 9 detachably mounted upon the front wall of the hollow bowl portion 6, the valve 8 being provided with an actuating stem 10 having a disk 11 secured to its outer end adapted to be pressed rearwardly to open the valve and being automatically seated or closed by a compression spring 12 interposed between the disk 11 and the casing 9; a nose operable lever 13 loosely swingably suspended at its upper rear portion from the saddle sockets 7 by means of alined opposite side pivots 14 and having a front dished nose contact plate 15 at its forward end located somewhat above the bottom of the bowl 5 while its medial portion is provided with an integral rearwardly extending tapered projection 16 cooperable with the liquid supply valve actuating disk 11 and which is surrounded by a velocity reducing or shock absorbing device 17, the rear central portion of the lever 13 also being provided with a lug 18 cooperable with a flange 19 on the valve casing 9; and a retainer plate 20 detachably secured to the top of the rear bowl portion 6 and having depending opposite side extensions 21 reaching into the sockets 7 to maintain the pivots 14 therein.

The liquid confining front portion and the hollow rear mounting portion 6 of the bowl 5 may be formed as a unitary casting of relatively non-corrosive metal; and the rear bowl portion 6 is provided with a pair of upper and lower vertically alined internally threaded openings to either of which a fresh liquid supply pipe 23 or a closure pipe plug 24 may be applied, as shown in Figs. 1 and 3, so that the drinking water may be admitted to the interior of the hollow portion 6 and to the valve 8, either from above or below the fountain. The rear extremity of the bowl portion 6 is also provided with side flanges 25 and an intervening detent, and a clamping bracket 26 is attachable to these flanges 25 by means of bolts 27 in order to firmly mount the fountain upon a supporting column 28 as in Fig. 3, or to any other suitable fixed support. The opposite sides of the rear bowl portion 6 are furthermore provided with outwardly projecting ears 29 to which the retainer plate 20 may be detachably secured by bolts 30, and the flanges 25 and the ears 29 are also formed integral with the bowl casting.

The fresh water supply valve assemblage is of relatively well known and standardized construction except that in the prior structures the valve 8 was usually disposed with its actuating stem 10 vertical, whereas in the present improved fountain the valve stem 10 is arranged approximately horizontal. The valve casing 9 is firmly but detachably secured to the rear wall of the bowl 5 by means of bolts and nuts 32 so that by releasing these nuts 32 the entire valve assemblage may be withdraw for inspection, cleaning and adjustment. A suitable sealing gasket 33 may also be inserted at the joint between the valve casing 8 and the bowl 5 in order to eliminate leakage, and the casing 9 has a tubular front portion within which the stem 10, disk 11 and spring 12 are normally confined and through which the fresh liquid is delivered.

The improved nose actuated lever 13 is of the second class wherein the pivots 14 constitute the fulcrum, and the projection 16 performs the work of opening the valve 8, while the power is applied by the drinking animals to the nose plate 15. This lever 13 is preferably formed of light but durable non-corrosive metal such as aluminum, and the velocity reducing and shock absorbing device 17 comprises an outer annular dome-shaped wall 35 disposed coaxially of and merging with the larger end of the tapered projection 16 and an inner annular wall 36 merging with the outer wall 35 and surrounding but spaced from the central projection 16, the inner surfaces of these walls forming a toroid generated about the axis of the projection 16, see Figs. 1 and 3. The lower-most portion of the outer annular wall 35 is provided with a liquid delivery slot or opening 37 while the free edge of the inner annular wall has an outwardly directed annular flange 38 formed thereon, and all of the elements of the device 17 are formed integral with each other and have smooth surfaces.

The nose lever pivots 14 are loosely confined within the sockets 7 of the bowl 5 so that they are normally free to rise and fall therein, and the rear lug 18 which is formed integral with the lever 13 is formed to lift the pivots 14 upwardly by contacting the valve flange 19 while the nose lever is being swung upwardly into inactive position and is adapted to thereafter drop in front of the flange 19 to hold the lever 13 in the position shown in Fig. 3. The retainer plate 20 which spans the top of the bowl portion 6 and is detachably secured to the bowl 5 by the bolts 30 has the extensions 21 which normally prevent the pivots 14 from lifting entirely out of the sockets 7 formed integral therewith, but these extensions 21 may be withdrawn when the bolts 30 are released in order to permit free removal of the nose actuated lever 13 and to give access to the valve assemblage and all portions of the bowl interior for cleaning purposes.

When the improved fountain has been properly constructed, assembled and installed, the various parts are normally disposed as illustrated in Figs. 1 and 2 with the bowl 5 partially supplied with fresh drinking water and the nose plate 15 in approximately horizontal position. When an animal applies its nose to the plate 15 and presses the latter down, the lever 13 swings about its fulcrum pivots 14 and thereby causes the projection 16 to press against the valve actuating disk 11 and to open the valve 8 while compressing the spring 12. Fresh water is then delivered in the form of an annular jet from the tubular portion of the valve casing 9 through the central annular inner wall 36 of the device 17 carried by the lever 13, and along and around the tapered valve actuating projection 16. This annular jet subsequently spreads gently outwardly and along the toroid bounding the interior of the dome shaped wall 35 and extending along the exterior of the inner annular wall 36, and is ultimately directed outwardly by the flange 38 and drops by gravity toward the lower opening 37 of the deflector. The velocity of flow of the jet of entering liquid is thus reduced or absorbed and the spent liquid flows through the opening 37 into the bowl 5 as long as the lever plate 15 is subjected to downward pressure.

This deceleration of the entering liquid by the toroid is effected automatically and without noise or shock, regardless of the pressure of the supply liquid, and no water can rush into the bowl 5 so as to spill over the bowl brim and onto the floor beneath. When the animal withdraws its nose from the plate 15, the spring 12 quickly becomes effective to swing the lever 13 back to normal position and to seat the valve 8; and when it becomes desirable to make the fountain inactive in order to clean the interior of the bowl 5 or to remove residual liquid therefrom so as to prevent freezing, it is only necessary to swing the lever 13 upwardly into the position shown in Fig. 3. During such upward movement of the nose lever 13, the rear lug 18 will ride over the flange 18 of the valve casing 9 and will eventually drop in front of this flange to firmly hold the lever 13 in upright position, and in order to again restore this lever to normal position it is only necessary to lift it slightly and to swing it forwardly and downwardly.

From the foregoing detailed description, it will be apparent that the improved fountain unit besides being exceedingly simple and compact in construction, also eliminates shock and spillage due to entry of the fresh liquid at high pressure and velocity and furthermore permits thorough cleaning and convenient inspection of all parts of the assemblage. In order to completely dismantle the unit it is only necessary to remove the bolts 30 so as to release the retainer plate 20, and to also release the nuts 32 after the water supply has been shut off, whereupon the lever 13 and the supply valve assembly may be freely removed. The depending extensions 21 of the retainer plate 20 while normally maintaining the pivots 14 within the sockets 7, permit these pivots to rise and fall during raising and lowering of the nose lever 13, and the toroid of the jet velocity absorbing device 17 carried directly by this lever 13 insured effective and silent deceleration of the entering liquid flow and effectively prevents liquid from spilling over the bowl brim. The improved fountains have gone into highly successful commercial use and can be manufactured and sold at moderate cost due to the relatively few simple parts involved therein and which may be produced with very little machining.

It should be understood that it is not desired to limit this invention to the exact details of construction and operation of the typical stock watering fountain shown and described herein, because various modifications within the scope of the appended claims may occur to persons skilled in the art.

I claim:

1. In an animal drinking fountain, a liquid confining bowl, an annular jet delivering valve communicating with the bowl interior, a nose actuable lever swingably suspended near one end upon said bowl and having a nose plate at its opposite end movable within the bowl, the medial portion of said lever having a projection cooperable with said valve to open the same when said nose plate is depressed, and an annular toroid wall carried by said lever and cooperating with said projection to reverse and decelerate said jet.

2. In an animal drinking fountain, a liquid confining bowl, an annular jet delivering valve communicating with the bowl interior, a nose actuable lever swingably suspended near one end upon said bowl and having a nose plate at its opposite end movable within the bowl, the medial portion of said lever having a projection cooperable with said valve to open the same when said nose plate is depressed, and an annular toroid wall carried by said lever and cooperating with said projection to reverse and decelerate said jet, said projection and said wall being integral with said lever and having smoothly merging surfaces.

3. In an animal drinking fountain, a liquid confining bowl, an annular jet delivering valve communicating with the rear of the bowl interior, a nose actuable lever swingably suspended at one end near said valve and having a nose plate at its opposite end movable toward and away from the bowl bottom, the medial portion of said lever having a rearwardly extending tapered projection acting upon and cooperable with said valve to open the same when said nose plate is depressed, and an annular toroid wall carried by said lever and merging with the wide portion of said tapered projection to reverse and decelerate said jet.

4. In an animal drinking fountain, a liquid confining bowl, an annular jet delivering spring-pressed reciprocable valve confined in a frusto-conical chamber communicating past said valve with the bowl interior, a nose actuable lever swingably suspended near one end upon said bowl and having a nose plate at its opposite end movable within the bowl, the medial portion of said lever having a projection cooperable with said valve to open the same when said nose plate is depressed, and an annular toroid wall carried by said lever and cooperating with said projection to reverse and decelerate said jet.

AUGUST F. KLINZING.

References Cited in the file of this patent

UNITED STATES PATENTS

| Number | Name | Date |
|---|---|---|
| 1,162,286 | Ferris | Nov. 30, 1915 |
| 1,344,189 | Rassmann | June 22, 1920 |
| 1,416,936 | Bogda | May 23, 1922 |
| 1,646,246 | Hazard | Oct. 18, 1927 |
| 2,469,946 | Bremer | May 10, 1949 |
| 2,476,876 | Klinzing | July 19, 1949 |
| 2,539,785 | Klinzing | Jan. 30, 1951 |
| 2,585,547 | Harmon | Feb. 12, 1952 |